(12) United States Patent
Kobayashi

(10) Patent No.: US 10,797,804 B2
(45) Date of Patent: Oct. 6, 2020

(54) COMMUNICATION UNIT AND COMMUNICATION SYSTEM

(71) Applicant: Sony Semiconductor Solutions Corporation, Kanagawa (JP)

(72) Inventor: Kenichi Kobayashi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/327,055

(22) PCT Filed: Sep. 13, 2017

(86) PCT No.: PCT/JP2017/032959
§ 371 (c)(1),
(2) Date: Feb. 21, 2019

(87) PCT Pub. No.: WO2018/070167
PCT Pub. Date: Apr. 19, 2018

(65) Prior Publication Data
US 2019/0222324 A1    Jul. 18, 2019

(30) Foreign Application Priority Data
Oct. 13, 2016 (JP) ................................. 2016-201752

(51) Int. Cl.
*H04B 13/00* (2006.01)
*H04W 72/04* (2009.01)
(Continued)

(52) U.S. Cl.
CPC ......... *H04B 13/005* (2013.01); *H04B 5/0012* (2013.01); *H04B 13/00* (2013.01);
(Continued)

(58) Field of Classification Search
CPC ...... H04B 13/00; H04B 13/005; H04B 13/02; H04B 5/0012; H04L 13/08; H04W 72/0446
(Continued)

(56) References Cited

U.S. PATENT DOCUMENTS

2009/0006778 A1* 1/2009 Sidi ....................... H04L 1/1835
711/154
2019/0158414 A1* 5/2019 Navon .................... H04L 47/52

FOREIGN PATENT DOCUMENTS

JP    2000-151537 A    5/2000
JP    2001-217750 A    8/2001
(Continued)

*Primary Examiner* — Lee Nguyen
(74) *Attorney, Agent, or Firm* — Michael Best & Friedrich LLP

(57) ABSTRACT

A communication unit according to the present disclosure includes: a communication circuit section that receives transmission data divided into head data and one or more subsequent data from an communicated unit over a period of a plurality of time-segments; a storage section having a storage region in which at least the transmission data received by the communication circuit section is stored; and a control section that places a limitation on an access period to cause a period of access to the storage region in a period of a time-segment in which the subsequent data is transmitted to become shorter than a period of access to the storage region in a period of a time-segment in which the head data is transmitted.

15 Claims, 14 Drawing Sheets

(51) Int. Cl.
*H04B 5/00* (2006.01)
*H04J 3/02* (2006.01)
*H04L 13/08* (2006.01)

(52) U.S. Cl.
CPC ............... *H04J 3/02* (2013.01); *H04L 13/08* (2013.01); *H04W 72/0446* (2013.01)

(58) Field of Classification Search
USPC ....................................................... 455/41.1
See application file for complete search history.

(56) References Cited

FOREIGN PATENT DOCUMENTS

| | | |
|---|---|---|
| JP | 2008-258767 A | 10/2008 |
| JP | 2011-141770 A | 7/2011 |
| JP | 2013-012916 A | 1/2013 |

* cited by examiner

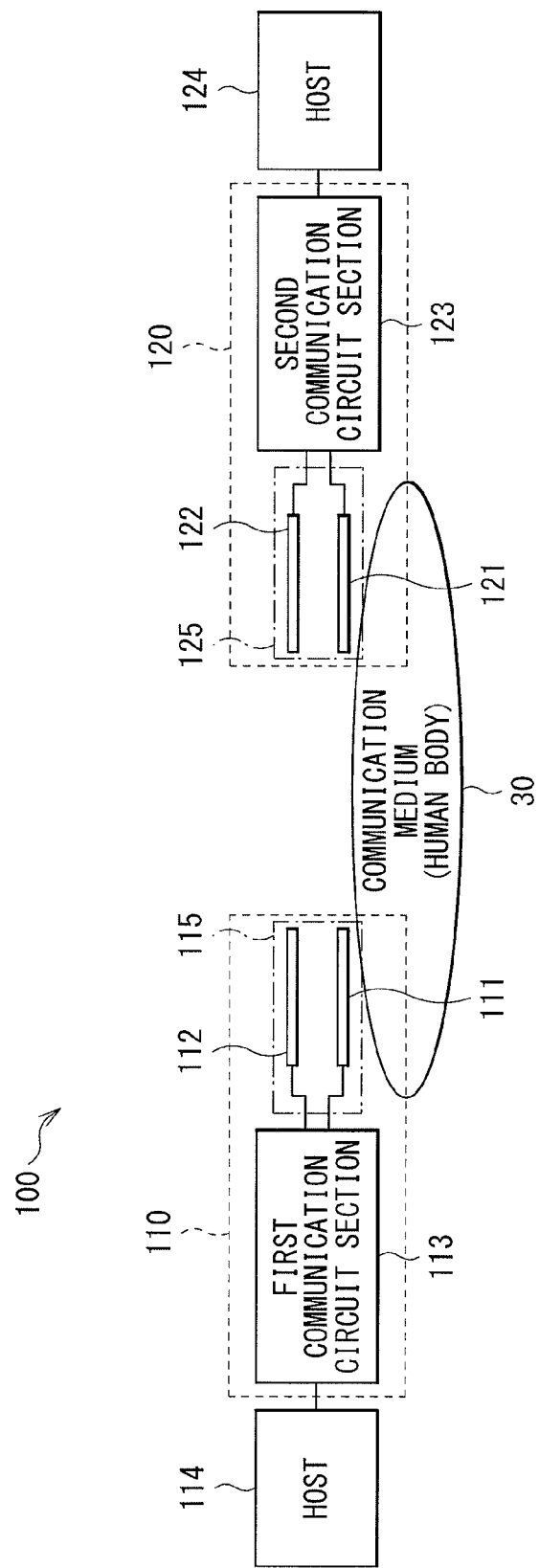
[ FIG. 1 ]

[ FIG. 2 ]
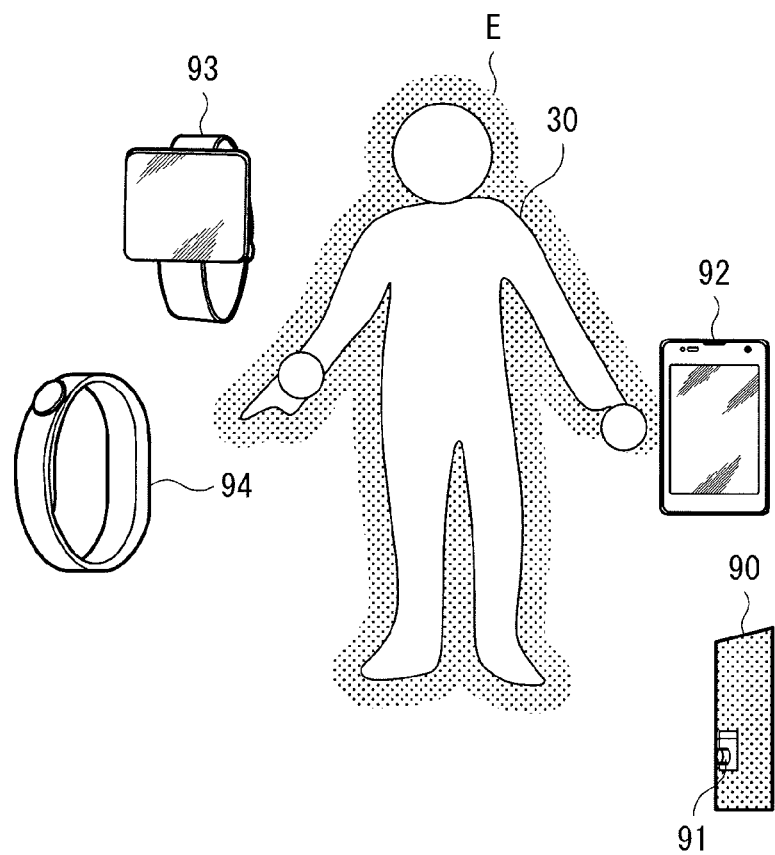

[ FIG. 3 ]
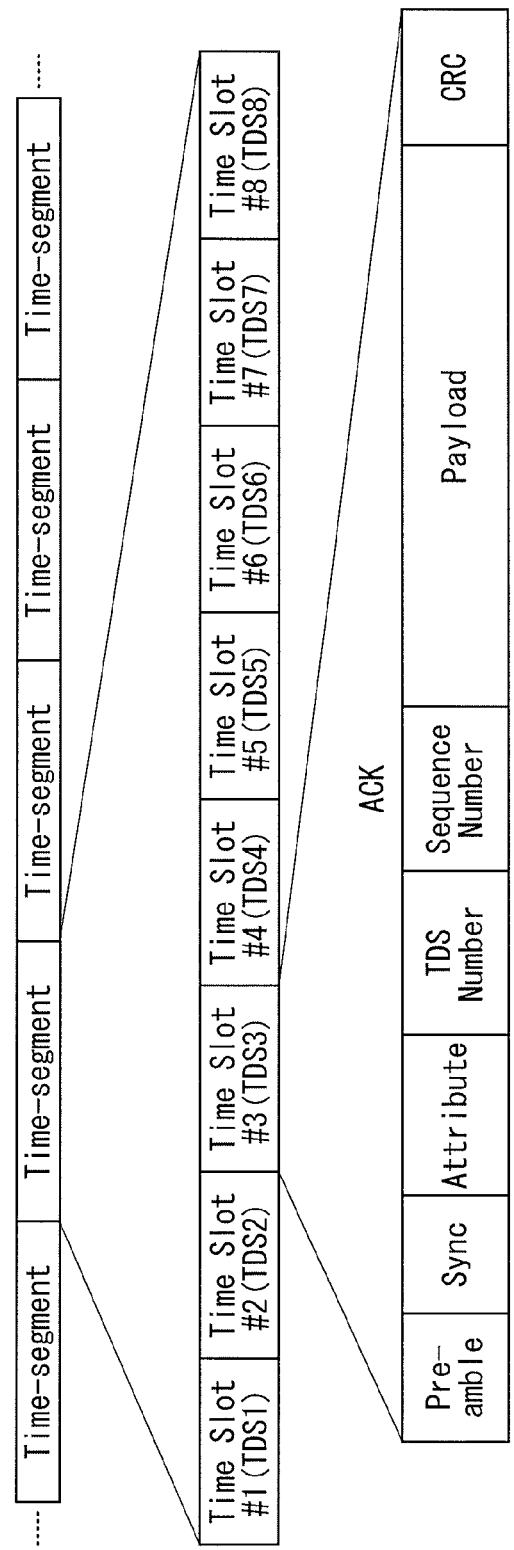

[ FIG. 4 ]
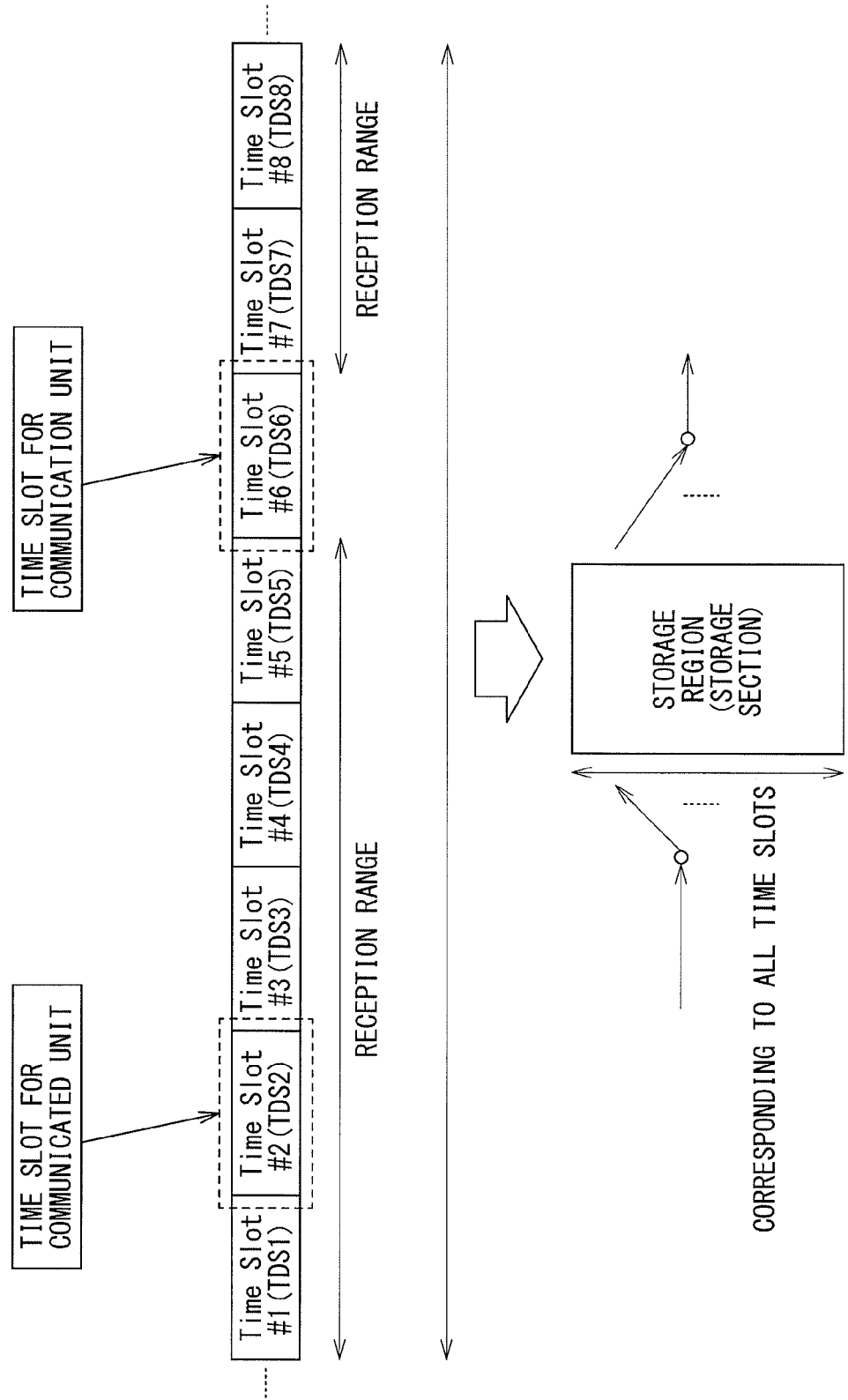

[ FIG. 5 ]
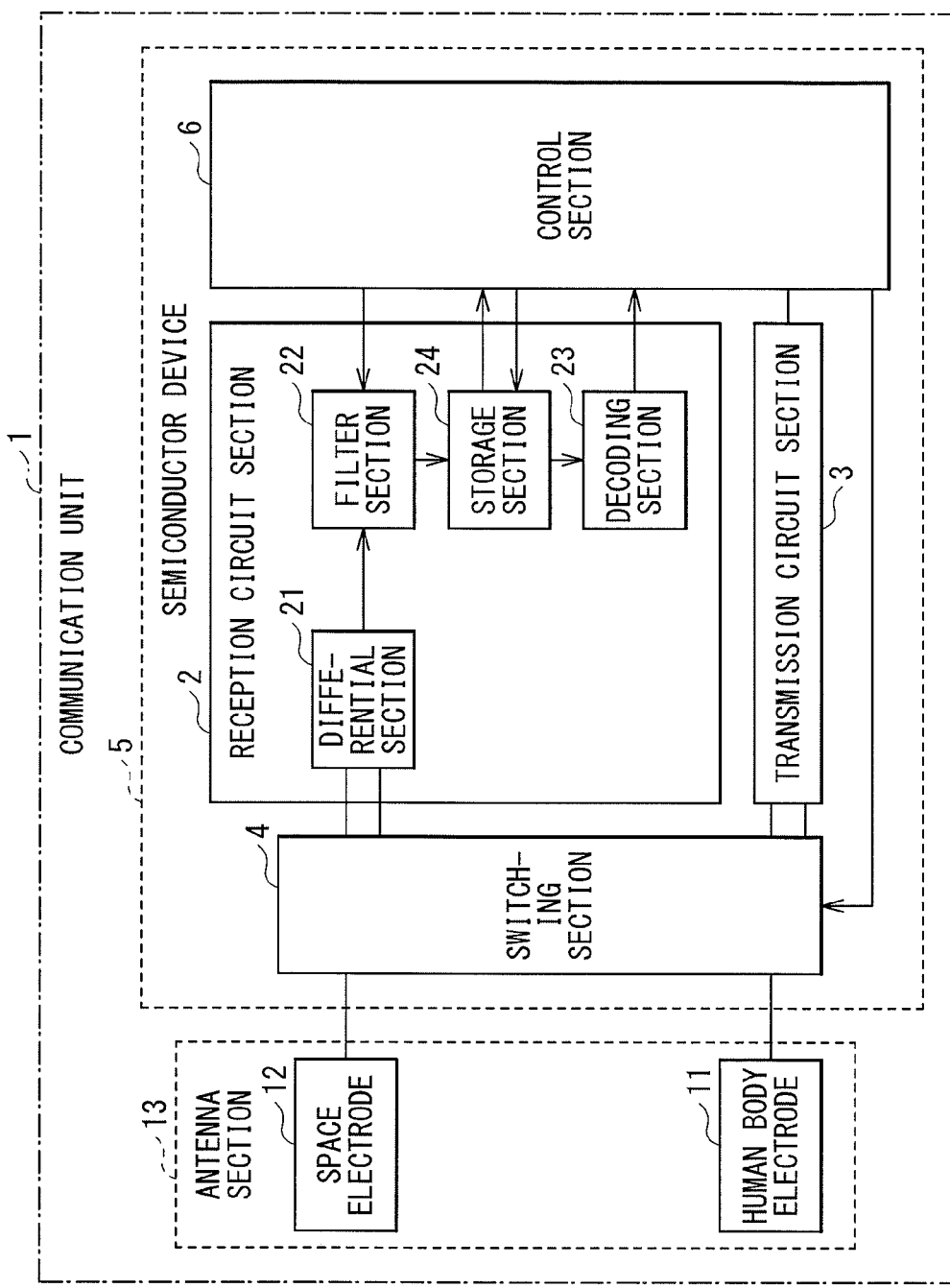

[ FIG. 6 ]
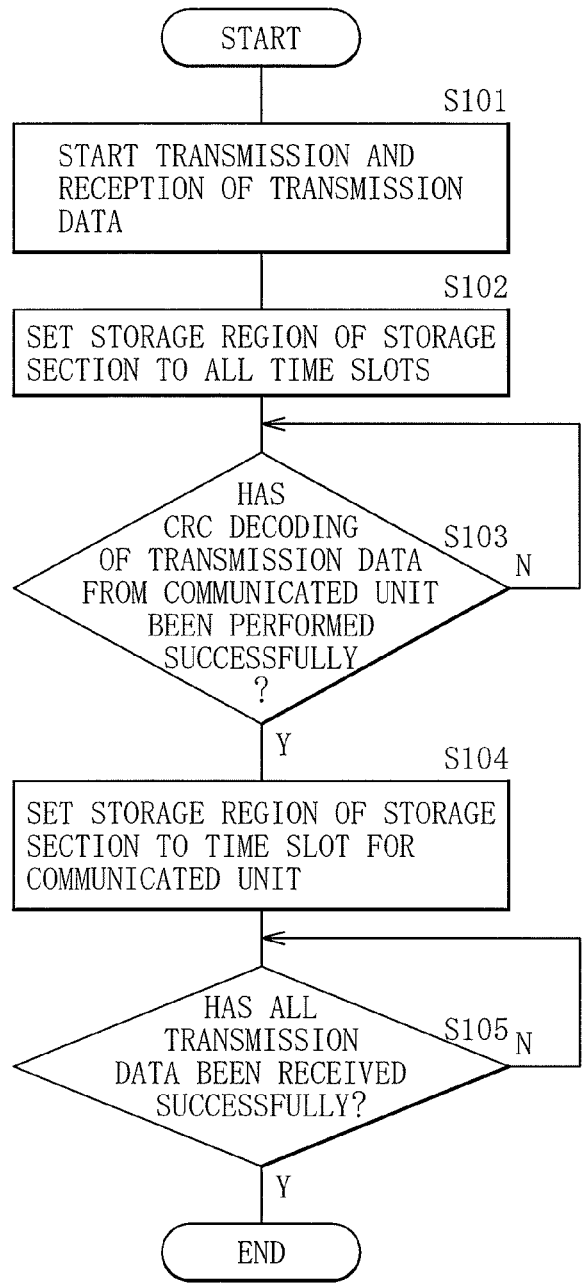

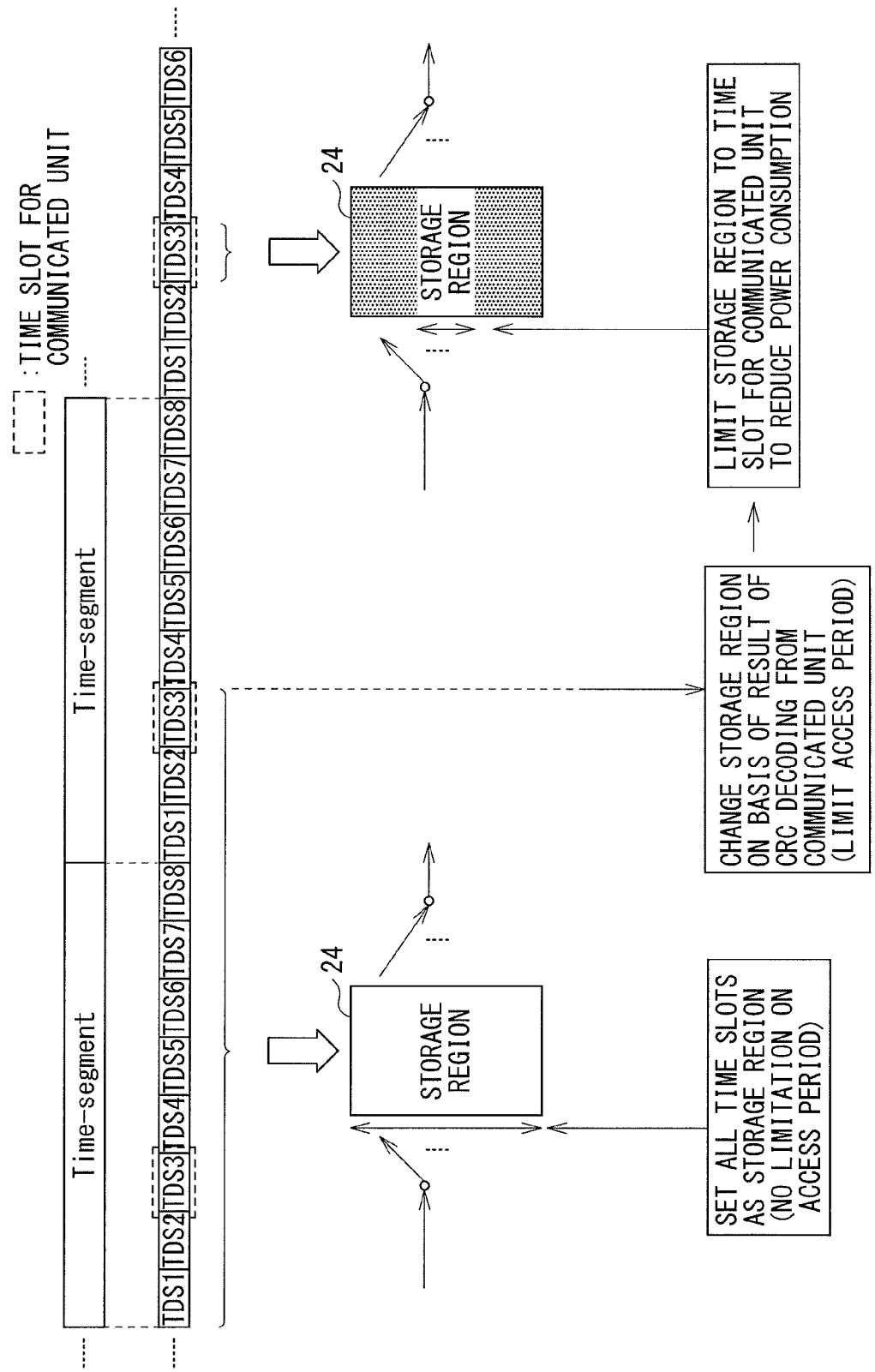
[FIG. 7]

[ FIG. 8 ]
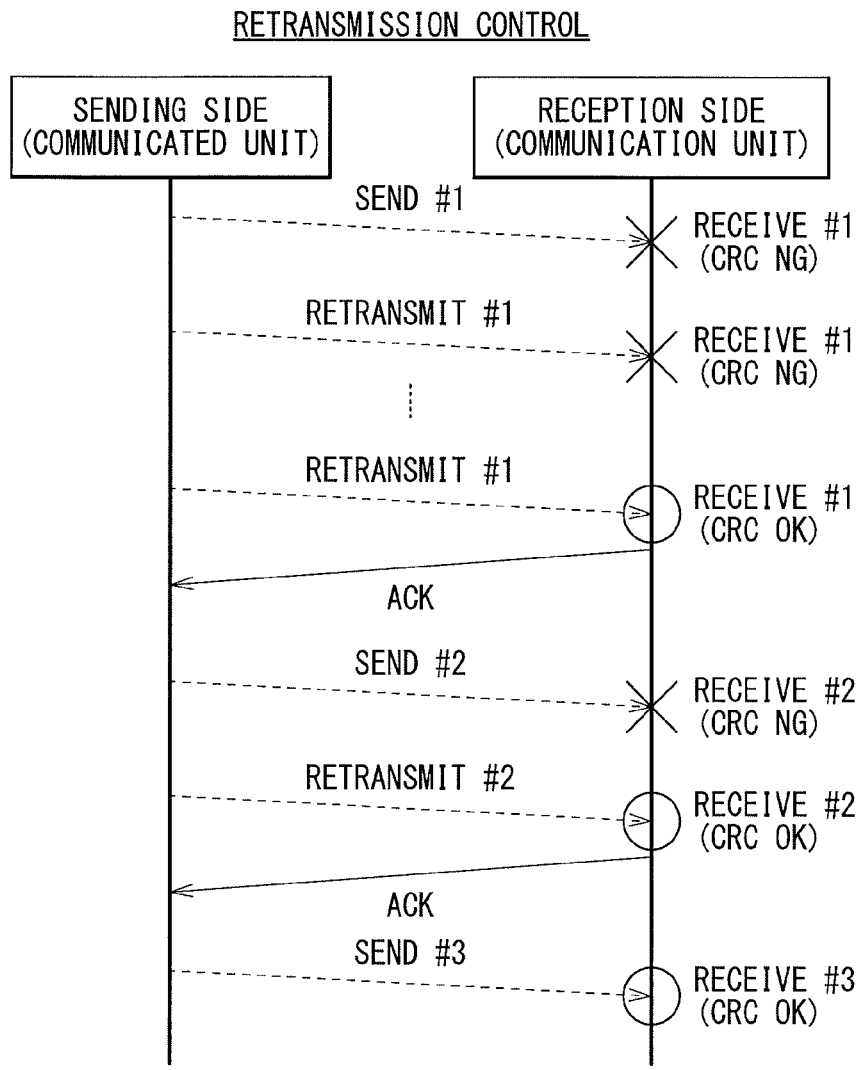

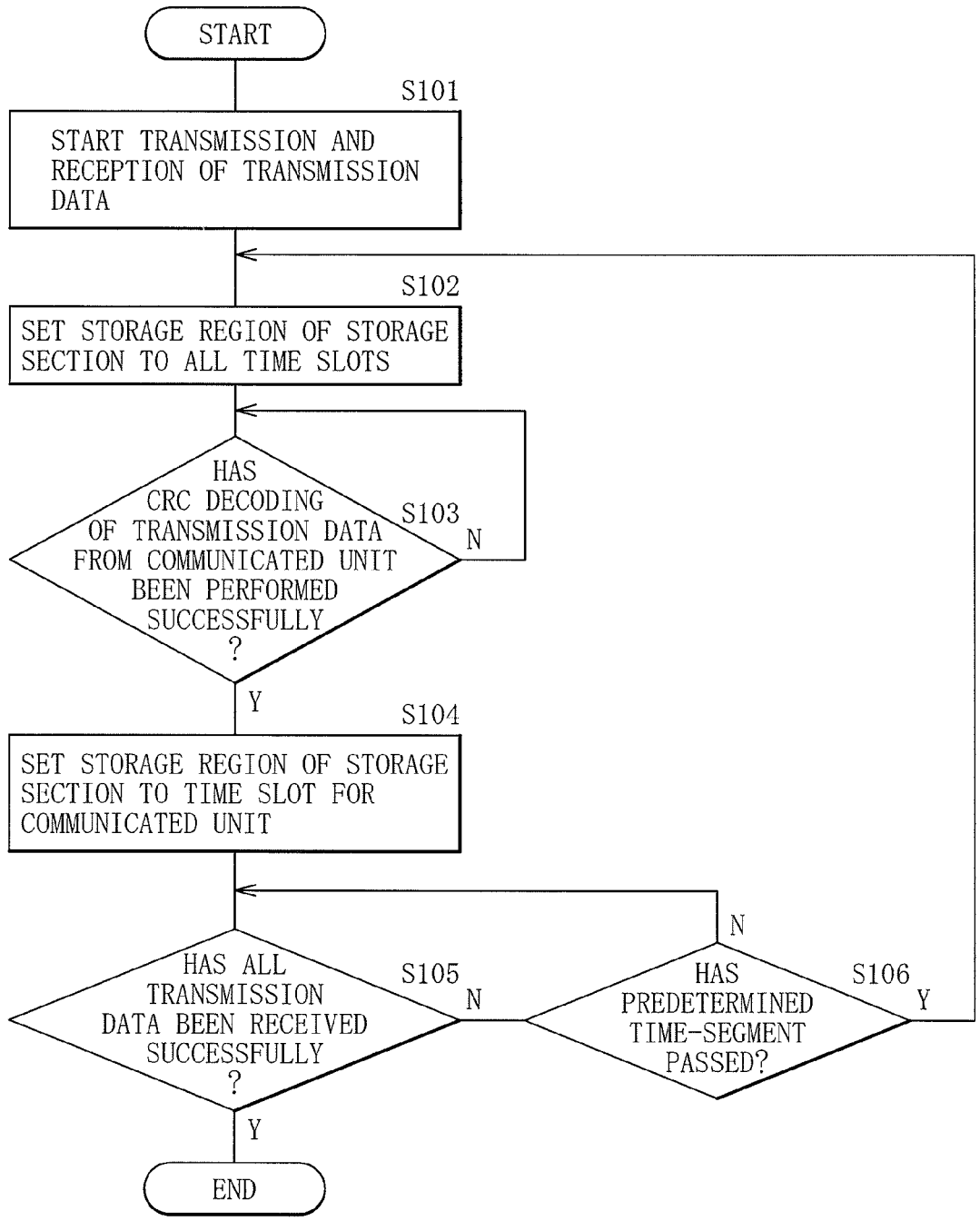

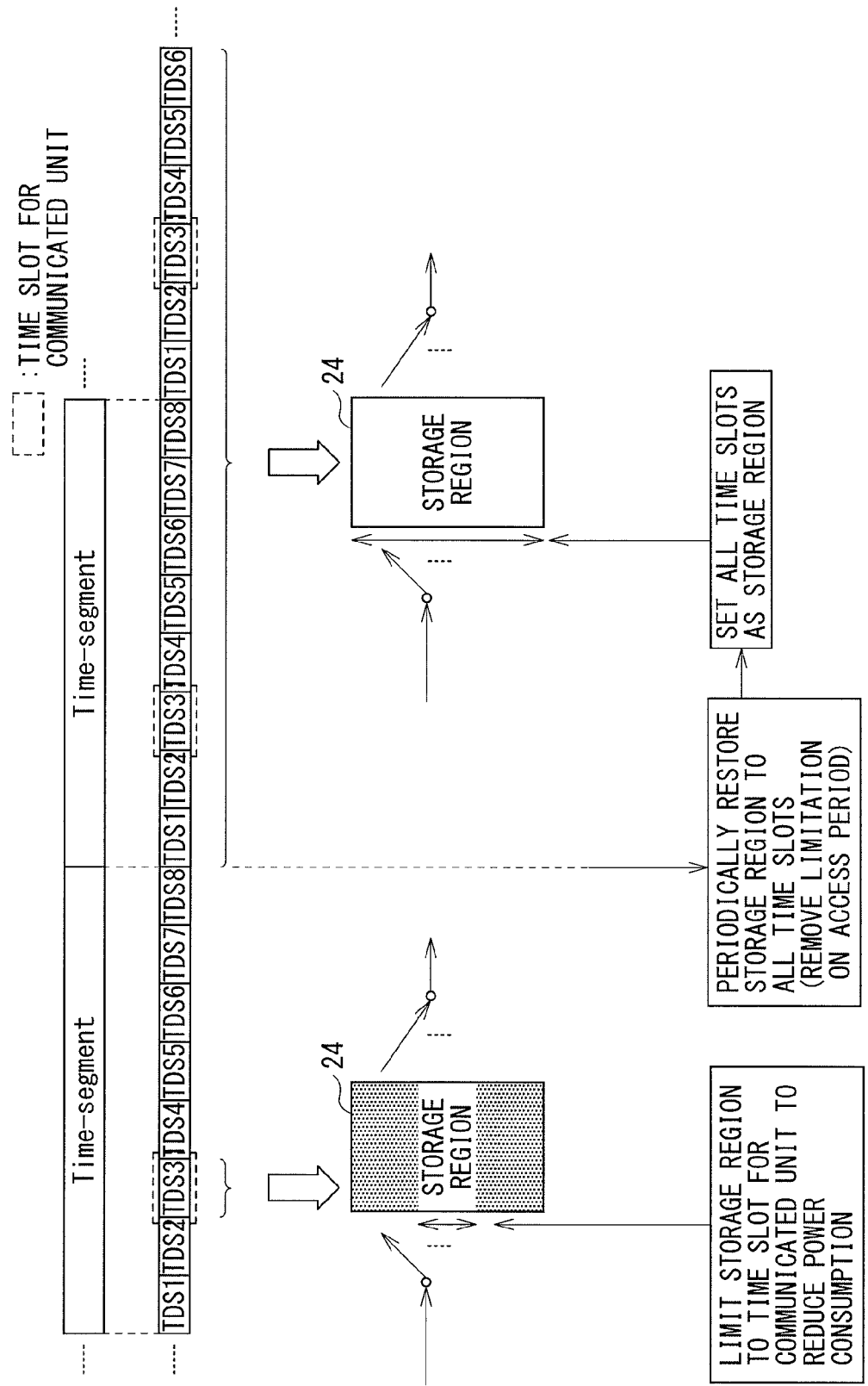
[ FIG. 10 ]

[ FIG. 11 ]
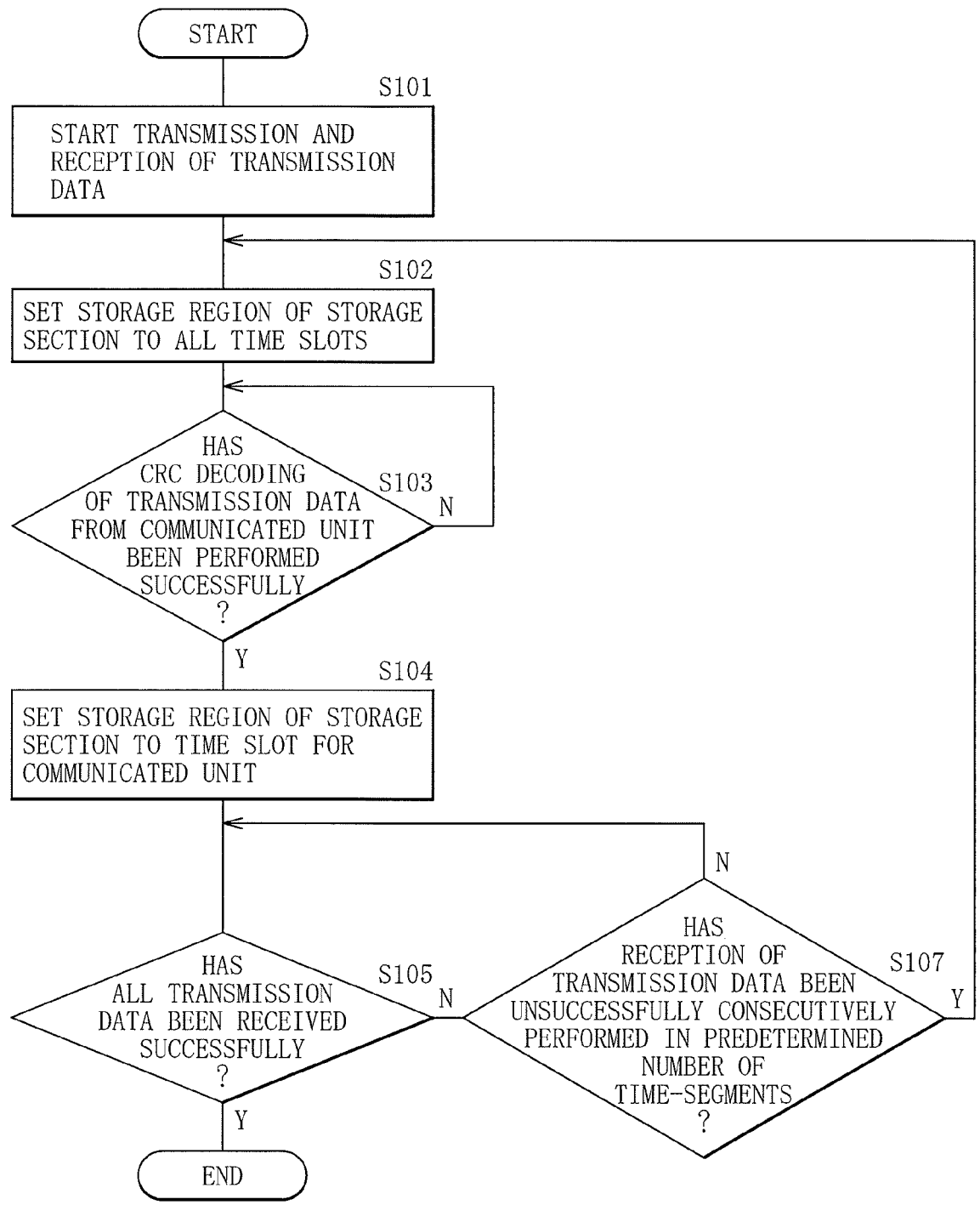

[ FIG. 12 ]
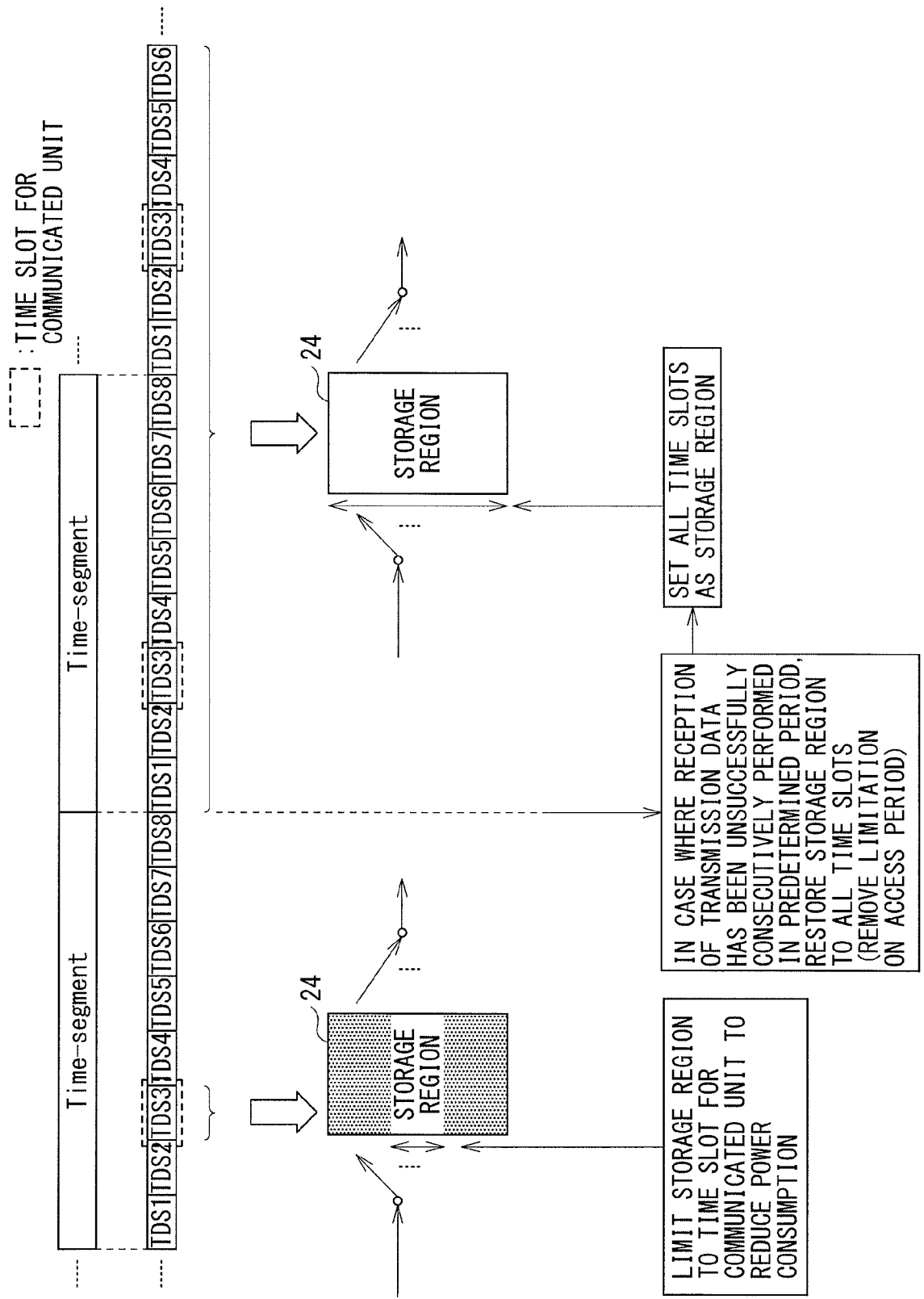

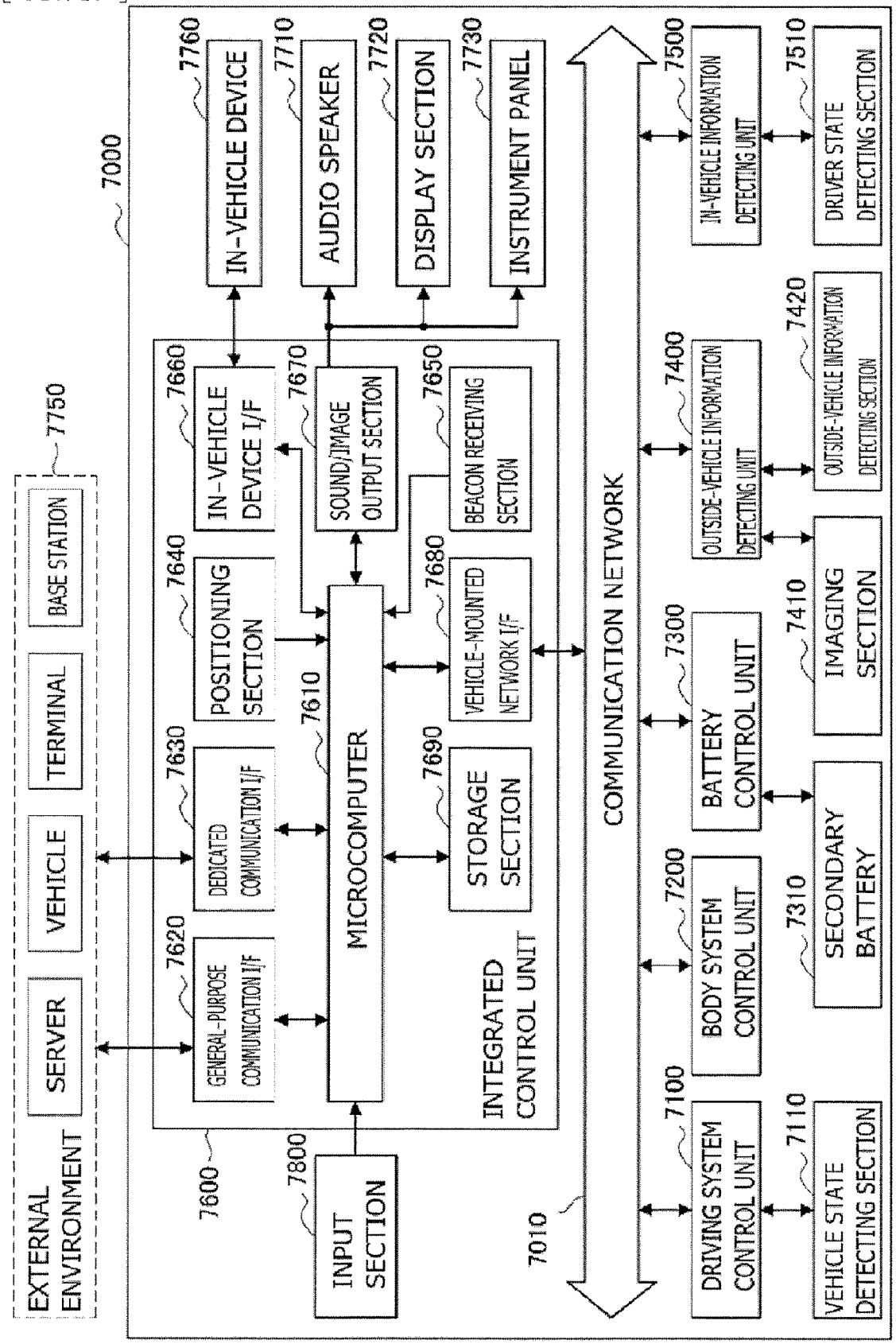
[ FIG. 13 ]

[ FIG. 14 ]
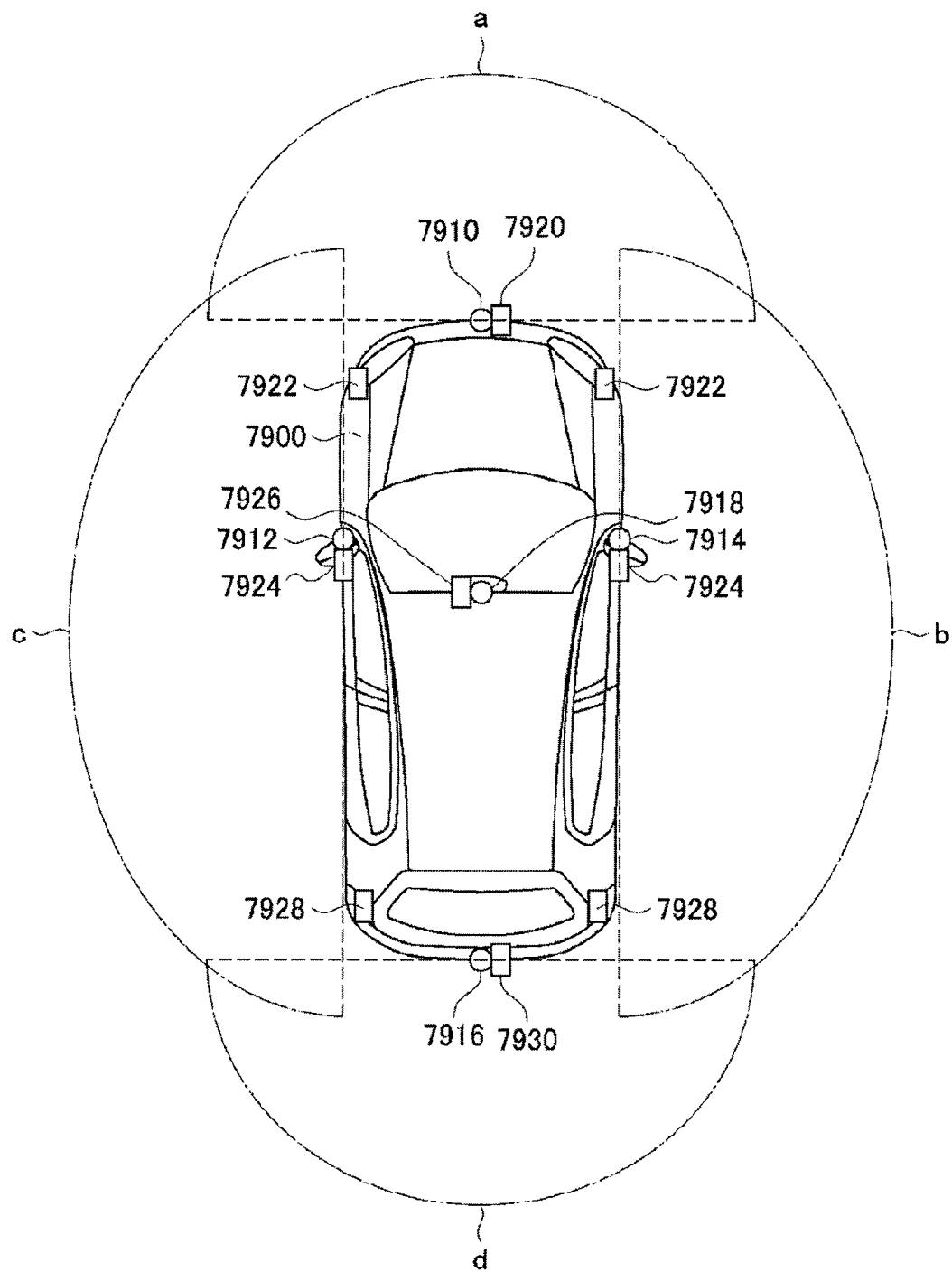

COMMUNICATION UNIT AND COMMUNICATION SYSTEM

TECHNICAL FIELD

The present disclosure relates to a communication unit and a communication system that are suitable for communication using the human body as a communication medium.

BACKGROUND ART

There is known a communication system that utilizes an electric field communication technique using, for example, a human body as a communication medium.

CITATION LIST

Patent Literature

PTL 1: Japanese Unexamined Patent Application Publication No. 2008-258767
PTL 2: Japanese Unexamined Patent Application Publication No. 2011-141770

SUMMARY OF THE INVENTION

In a communication system utilizing an electric field communication technique, transmission data received from a communicated unit is temporarily stored in a storage section, and signal processing such as decoding processing is performed on the data; however, access to a storage region of the storage section is increased with an increase in data to be stored, which may increase power consumption.

It is desirable to provide a communication unit and a communication system that make it possible to suppress access to a storage region in which transmission data is stored, thereby reducing power consumption.

A communication unit according to an embodiment of the present disclosure includes: a communication circuit section that receives transmission data divided into head data and one or more subsequent data from an communicated unit over a period of a plurality of time-segments; a storage section having a storage region in which at least the transmission data received by the communication circuit section is stored; and a control section that places a limitation on an access period to cause a period of access to the storage region in a period of a time-segment in which the subsequent data is transmitted to become shorter than a period of access to the storage region in a period of a time-segment in which the head data is transmitted.

A communication system according to an embodiment of the present disclosure includes a first communication unit; and a second communication unit that transmits transmission data to the first communication unit. One or both of the first communication unit and the second communication unit include a communication circuit section that receives transmission data divided into head data and one or more subsequent data from an communicated unit over a period of a plurality of time-segments, a storage section having a storage region in which at least the transmission data received by the communication circuit section is stored, and a control section that places a limitation on an access period to cause a period of access to the storage region in a period of a time-segment in which the subsequent data is transmitted to become shorter than a period of access to the storage region in a period of a time-segment in which the head data is transmitted.

In the communication unit or the communication system according to the embodiment of the present disclosure, the access period is limited to cause the period of access to the storage region in the period of the time-segment in which the subsequent data is transmitted to become shorter than the period of access to the storage region in the period of the time-segment in which the head data is transmitted.

According to the communication unit or the communication system of the embodiment of the present disclosure, the limitation is placed on the access period to cause the period of access to the storage region in the period of the time-segment in which the subsequent data is transmitted to become shorter than the period of access to the storage region in the period of the time-segment in which the head data is transmitted, which makes it possible to suppress access to the storage region in which transmission data is stored, thereby reducing power consumption.

It is to be noted that the effects described here are not necessarily limitative, and may be any of effects described in the present disclosure.

BRIEF DESCRIPTION OF DRAWINGS

FIG. 1 is a configuration diagram illustrating an outline of a communication system according to Comparative Example using a human body as a communication medium.

FIG. 2 is an explanatory diagram illustrating the outline of the communication system according to Comparative Example.

FIG. 3 is an explanatory diagram illustrating an example of a transmission format in the communication system according to Comparative Example.

FIG. 4 is an explanatory diagram illustrating issues of the communication system according to Comparative Example.

FIG. 5 is a block diagram schematically illustrating a configuration example of a communication unit according to a first embodiment of the present disclosure.

FIG. 6 is a flowchart schematically illustrating an example of a control flow about control of a storage region by the communication unit according to the first embodiment.

FIG. 7 is an explanatory diagram schematically illustrating an example of control of the storage region in the communication unit according to the first embodiment.

FIG. 8 is an explanatory diagram schematically illustrating an example of retransmission control in the communication unit according to the first embodiment.

FIG. 9 is a flowchart schematically illustrating an example of a control flow about control of a storage region by a communication unit according to a second embodiment.

FIG. 10 is an explanatory diagram schematically illustrating an example of control of the storage region in the communication unit according to the second embodiment.

FIG. 11 is a flowchart schematically illustrating an example of a control flow about control of a storage region by a communication unit according to a third embodiment.

FIG. 12 is an explanatory diagram schematically illustrating an example of control of the storage region in the communication unit according to the third embodiment.

FIG. 13 is a block diagram depicting an example of schematic configuration of a vehicle control system.

FIG. 14 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. It is to be noted that description is given in the following order.

0. Comparative Example (Outline and Issues of Communication System Using Human Body as Communication Medium) (FIGS. 1 to 4)
1. First Embodiment
1.1 Configuration (FIG. 5)
1.2 Operation (FIGS. 6 to 8)
1.3 Effects
2. Second Embodiment
2.1 Configuration and Operation (FIGS. 9 and 10)
3. Third Embodiment
3.1 Configuration and Operation (FIGS. 11 and 12)
4. Fourth Embodiment (Application Example) (FIGS. 13 and 14)
5. Other Embodiments <0. Comparative Example>

(Outline and Issues of Communication System Using Human Body as Communication Medium)

FIGS. 1 and 2 each illustrate an outline of a communication system according to Comparative Example that utilizes an electric field communication technique and uses a human body 30 as a communication medium.

A communication system 100 according to this Comparative Example includes a first communication unit 110 and a second communication unit 120.

The communication system 100 may be utilized for communication between a communication apparatus mounted on a wearable apparatus such as a smart watch 93 and a wristband terminal 94, and a communication apparatus mounted on a doorknob 91 of a door 90, a smartphone 92, etc., as illustrated in, for example, FIG. 2. For example, one of the first communication unit 110 and the second communication unit 120 may be provided at the smart watch 93, etc., and the other may be provided at the smartphone 92, etc. Further, the communication system 100 may be utilized for unlocking, etc. of automobile doors. For example, one of the first communication unit 110 and the second communication unit 120 may be installed in automobile doors. Furthermore, the communication system 100 may also be used for unlocking, etc. of the door 90 with a locking function used for room entry and exit, besides the automobile doors.

The first communication unit 110 includes a first antenna section 115 and a first communication circuit section 113. The first antenna section 115 includes, as communication electrodes, a first human body electrode 111 and a first space electrode 112. The first communication circuit section 113 is coupled to a host 114.

The second communication unit 120 includes a second antenna section 125 and a second communication circuit section 123. The second antenna section 125 includes, as communication electrodes, a second human body electrode 121 and a second space electrode 122. The second communication circuit section 123 is coupled to a host 124.

The first communication circuit section 113 and the second communication circuit section 123 each include a communication circuit employing an electric field communication method (a quasi-electrostatic field communication method).

The first communication circuit section 113 may include at least a transmission circuit (a transmitter). The second communication circuit section 123 may include at least a reception circuit (a receiver). Further, the first communication circuit section 113 and the second communication circuit section 123 may each include a transmitter-receiver circuit, and bidirectional communication may be possible between the first communication unit 110 and the second communication unit 120.

In a case where a signal is sent from the first communication unit 110, the first communication circuit section 113 generates a sending signal of a potential difference including a signal modulated by a predetermined modulation system, between the first human body electrode 111 and the first space electrode 112. The first human body electrode 111 is disposed on side closer to the human body 30 than the first space electrode 112. The first human body electrode 111 is thereby disposed to have stronger capacitive coupling to the communication medium (the human body 30) than the first space electrode 112.

In this communication system, by bringing a portion of the human body 30 closer to the second human body electrode 121 than to the second space electrode 122, a human-body-side communication path that uses the human body 30 as a communication medium is formed between the first human body electrode 111 and the second human body electrode 121. In addition, a space-side communication path that uses a space (e.g., air) as a communication medium is formed between the first space electrode 112 and the second space electrode 122.

A potential difference corresponding to a sending signal transmitted through the human-body-side communication path and the space-side communication path is generated between the second human body electrode 121 and the second space electrode 122. The second communication circuit section 123 detects the potential difference generated between the second human body electrode 121 and the second space electrode 122, performs demodulation processing corresponding to the modulation system of the first communication circuit section 113 to generate a reception signal, and outputs the reception signal as an output signal.

In the electric field communication method (the quasi-electrostatic field communication method), strong coupling between the human body electrodes enables the first communication unit 110 and the second communication unit 120 to perform communication therebetween. The first communication unit 110 and the second communication unit 120 are able to perform communication when a person comes into contact with the human body electrodes; however, even when the person comes close to the human body electrodes, an electric field E is distributed over a surface of the human body as illustrated in FIG. 2, which enables the communication to be performed. Accordingly, the communication is possible only in the immediate vicinity of the human body 30. This method is also highly compatible with a wearable device.

A Transmission Format

Examples of a standard of the electric field communication as described above include ISO/IEC 17982 CCCC PHY (Closed Capacitive Coupling Communication Physical Layer). The ISO/IEC 17982 CCCC PHY (hereinafter referred to as CCCC-PHY) adopts automatic retransmission control (ARQ; Automatic Repeat reQuest) using an error detection code and retransmission control.

FIG. 3 illustrates an example of a transmission format according to the CCCC-PHY standards.

In the CCCC-PHY standards, transmission data are transmitted between a communicated unit (for example, the first communication unit 110) and a communication unit (for example, the second communication unit 120), in each time-segment having a predetermined interval. One time-segment is configured by a predetermined division number of time slots (time division slot (TDS)).

For example, transmission data divided into head data and one or more subsequent data is sent from the communicated unit. The communication unit receives the transmission data from the communicated unit over a period of a plurality of time-segments. The transmission data from the communicated unit is transmitted in a period of one time slot of a plurality of time slots in each of the plurality of time-segments. In a case where there exist a plurality of communicated units or a plurality of communication units, different time slots are assigned to the respective units within one time-segment. The time slots are assigned by the communicated unit or the communication unit that is the first unit to start the communication.

The transmission data transmitted in a period of one time slot is packet data. The packet data includes Pre-amble, Sync data, Attribute data, a TDS Number, and a Sequence Number (a number for retransmission). Furthermore, the packet data includes Payload, which is real data of the transmission data, and a cyclic redundancy check (CRC) as an error detection code.

The communication unit identifies a time slot of the communicated unit on the basis of a result of CRC decoding. The communication unit determines whether or not it is a communication terminal that the communication unit itself desires to communicate with on the basis of a Payload portion of the transmission data of which the CRC decoding has been performed successfully. The communication unit sends back data using a time slot assigned by the communicated unit. For example, in a case where the communication unit receives transmission data from the communicated unit, the communication unit sends, to the communicated unit, a reply of acknowledgment (ACK) indicating that the transmission data has been normally received within a period of the same time-segment as the time-segment in which the received transmission data has been transmitted. In this case, the communication unit transmits incremented Sequence Number of the communicated unit as a Sequence Number of transmission data to be replied.

Issues

In a communication system of the CCCC-PHY standards as described above, in a period of one time-segment, another communicated unit and another communication unit may perform communication in time slots other than time slots assigned to one communicated unit and one communication unit, To prevent signal interference between these respective units, it is necessary to appropriately keep maintaining timings of time slots in the respective units.

For example, in a case where a time slot assigned to one communicated unit is TDS2, and a time slot assigned to one communication unit is TDS6 as illustrated in FIG. 4, a minimum zone necessary for the communication unit to receive transmission data from the communicated unit is only TDS2. However, if a reception range is limited to the time slot assigned to the communicated unit, various timing errors generated in the communication unit may cause the timings of time slots in the communication unit to gradually deviate from original timings. Accordingly, in general, in the communication unit, zones of time slots other than the time slots TDS2 and TDS6 assigned to the one communicated unit and the communication unit itself are also included in a signal reception range, and the communication unit adjusts the timings of time slots on the basis of a result of CRC decoding included in the received transmission data.

Furthermore, for the purpose of improving reception quality, the communication unit holds the transmission data in a storage section and performs decoding processing. Uses of the stored data include improving a S/N ration (signal-to-noise ratio) by accumulation of the data, controlling application of a filter, etc. The communication unit stores the transmission data received in all the time slots included in the reception range. The communication unit accesses a storage region of the storage section in a period of all the plurality of time slots.

However, if transmission data in all the time slots within the time-segment is stored in the storage section, access to the storage region of the storage section is constantly generated; therefore, power consumption is large.

From those described above, it is desired to develop a technique that makes it possible to suppress access to the storage region in which transmission data is stored in a communication unit or a communication system based on the CCCC-PHY standards, thereby reducing power consumption.

1. First Embodiment

[1.1 Configuration]

FIG. 5 schematically illustrates a configuration example of a communication unit 1 according to a first embodiment of the present disclosure.

The communication unit 1 according to the present embodiment may be applied to one or both of the first communication unit 110 and the second communication unit 120 in the communication system 100 according to Comparative Example described above. In this case, the first communication unit 110 and the second communication unit 120 may be a transmitter-receiver that transmits and receives data bidirectionally. For example, the communicated unit that communicates with the communication unit 1 according to the present embodiment may be set as the first communication unit 110, and the communication unit 1 according to the present embodiment may be set as the second communication unit 120.

The communication unit 1 according to the present embodiment is able to perform communication in the above-described transmission format based on the CCCC-PHY standards illustrated in FIG. 3.

The communication unit 1 according to the present embodiment includes an antenna section 13, a reception circuit section 2 that receives reception data from the communicated unit through the antenna section 13, and a transmission circuit section 3 that sends sending data to the communicated unit through the antenna section. Further, the communication unit 1 includes a switching section 4 provided between the antenna section 13 and both the reception circuit section 2 and the transmission circuit section 3, and a control section 6 that controls the switching section 4, the reception circuit section 2, and the transmission circuit section 3.

The antenna section 13 corresponds to, for example, the above-described second antenna section 125 of the second communication unit 120 in FIG. 1. The antenna section 13 includes a human body electrode 11 as a first electrode and a space electrode 12 as a second electrode. The human body electrode 11 corresponds to, for example, the above-described second human body electrode 121 of the second communication unit 120 in FIG. 1. The space electrode 12 corresponds to, for example, the above-described second space electrode 122 of the second communication unit 120 in FIG. 1.

The reception circuit section 2, the transmission circuit section 3, the switching section 4, and the control section 6 may be provided in one semiconductor device (an integrated circuit (IC)) 5.

The reception circuit section 2 and the transmission circuit section 3 are each a communication circuit section that transmits transmission data to the communicated unit in each time-segment configured by a predetermined division number of time slots.

The reception circuit section 2 includes a differential section 21, a filter section 22, a decoding section 23, and a storage section 24.

Reception data of a differential signal is inputted to the differential section 21 through the human body electrode 11 and the space electrode 12.

The switching section 4 is able to switch electrical coupling relationships between the antenna section 13 and the reception circuit section 2 and between the antenna section 13 and the transmission circuit section 3. The switching section 4 is coupled to the differential section 21, and is able to switch the electrical coupling relationship between the antenna section 13 and the reception circuit section 2 through the differential section 21.

The control section 6 controls the switching section 4 to cause the antenna section 13 and the reception circuit section 2 to be electrically coupled to each other in a case where the reception circuit section 2 receives reception data from the communicated unit.

The control section 6 controls the switching section 4 to cause the antenna section 13 and the transmission circuit section 3 to be electrically coupled to each other in a case where the transmission circuit section 3 sends sending data to the communicated unit.

As illustrated in FIG. 3 described above, each of the plurality of time-segments includes a plurality of time slots, and transmission data from the communicated unit is transmitted in a period of one time slot of the plurality of time slots in each of the plurality of time-segments.

The reception circuit section 2 receives transmission data divided into head data and one or more subsequent data from the communicated unit over a period of a plurality of time-segments.

The storage section 24 has a storage region in which at least the transmission data received by the reception circuit section 2 is stored.

The control section 6 places a limitation on an access period to cause a period of access to the storage region of the storage section 24 in a period of a time-segment in which the subsequent data is transmitted to become shorter than a period of access to the storage region of the storage section 24 during a time-segment in which the head data is transmitted.

[1.2 Operation]

FIG. 6 illustrates an example of a control flow about control of the storage region by the communication unit 1 according to the present embodiment. FIG. 7 schematically illustrates an example of the control of the storage region in the communication unit 1 according to the present embodiment.

As illustrated in FIG. 7, in a period of a time-segment in which head data from the communicated unit is transmitted, the control section 6 sets a period of all the plurality of time slots as a period of access to the storage region of the storage section 24 (no access limitation). Further, in a period of a time-segment in which subsequent data from the communicated unit is transmitted, the control section 6 places a limitation on an access period to cause a period of one time slot of the plurality of time slots to become a period of access to the storage region of the storage section 24.

In the communication unit 1, the reception circuit section 2 or the transmission circuit section 3 first starts transmission and reception of transmission data (step S101). Next, the control section 6 sets the period of access to the storage region of the storage section 24 to a period of all the time slots (step S102).

Next, the control section 6 determines whether or not CRC decoding of the transmission data from the communicated unit has been performed successfully on the basis of a result of decoding by the decoding section 23 (step S103).

In a case where the CRC decoding has not been performed successfully (step S103; N), such determination is repeated until the CRC decoding has been performed successfully. In contrast, in a case where the CRC decoding has been performed successfully (step S103; Y), the control section 6 next sets the period of access to the storage region of the storage section 24 to a period of a time slot assigned to reception of data from the communicated unit (step S104).

Next, the control section 6 determines whether or not all the transmission data from the communicated unit has been received successfully on the basis of a result of decoding by the decoding section 23 (step S105). In a case where all the transmission data has not been received successfully (step S105; N), the control section 6 repeats such determination until all the transmission data has been received successfully. In contrast, in a case where all the transmission data has been received successfully (step S105; Y), the control section 6 ends the process.

As described above, after CRC decoding of head data from the communicated unit has been performed successfully, the control section 6 places a limitation on the period of access to the storage region of the storage section 24. In a period of reception of subsequent data from the communicated unit, access to the storage region is limited to a period of a time slot assigned to the communicated unit; therefore, the frequency of access to the storage region is reduced, which makes it possible to reduce power consumption.

FIG. 8 schematically illustrates an example of retransmission control in the communication unit 1 according to the present embodiment.

In a case where head data (#1) from the communicated unit has been received normally (CRC OK), the transmission circuit section 3 sends, to the communicated unit, a reply of acknowledgment (ACK) indicating that the head data has been normally received within a period of the same time-segment as the time-segment in which the head data has been transmitted.

In a case where there is no reply of acknowledgment (CRC NG), the communicated unit retransmits the head data in a period of a time-segment different from the time-segment in which the head data has been transmitted unsuccessfully, and in a case where there is a reply of acknowledgment, the communicated unit sends subsequent data (#2) in a period of a time-segment different from the time-segment in which the head data has been transmitted.

In a case where there are other subsequent data (#3), (#4), and the like subsequent to the subsequent data (#2), similar retransmission control is performed on the other subsequent data (#3), (#4), and the like.

The communicated unit is able to observe ACK from the communication unit 1, and therefore is able to recognize that the communication unit 1 has placed a limitation on the period of access to the storage region of the storage section 24.

[1.3 Effects]

As described above, according to the present embodiment, the access period is limited to cause a period of access to the storage region in a period of a time-segment in which subsequent data is transmitted to become shorter than a period of access to the storage region in a period of a time-segment in which head data is transmitted; therefore, access to the storage region in which transmission data is stored is suppressed, which may reduce power consumption.

It is to be noted that the effects described herein are merely illustrative and not limitative, and may have other effects. The same holds true also for effects of other embodiments as described hereinbelow.

2. Second Embodiment

Next, a communication unit according to a second embodiment of the present disclosure is described. It is to be noted that in the following, substantially same components as those of the communication unit according to the above-described first embodiment are denoted by same reference numerals, and description thereof is omitted where appropriate.

[2.1 Configuration and Operation]

FIG. 9 illustrates an example of a control flow about control of a storage region by the communication unit according to the present embodiment. FIG. 10 schematically illustrates an example of the control of the storage region in the communication unit according to the present embodiment.

A configuration of the communication unit according to the present embodiment may be substantially similar to the configuration in FIG. 5. However, the way for the control section 6 to control the period of access to the storage region of the storage section 24 is partly different.

In the above-described first embodiment, the control section 6 uniformly places a limitation on access to the storage region in a period of reception of subsequent data from the communicated unit; however, in the present embodiment, in a case where a plurality of subsequent data are received over a period of a plurality of time-segments, the limitation on the access period is periodically removed as illustrated in FIG. 10.

After the limitation is placed on the access period, reception quality in time-segments other than a time-segment in which data from the communicated unit is received is decreased; therefore, there may be a possibility of failure in time-segment synchronization. Accordingly, in the communication unit according to the present embodiment, the period of access to the storage region of the storage section 24 is periodically restored to a period of all time slots to keep maintaining the time-segment synchronization. Thus, in the communication unit according to the present embodiment, power consumption increases as compared with a case of limiting the storage region constantly in a period of reception of subsequent data as with the above-described first embodiment; however, it is possible to prevent failure in time-segment synchronization.

The control flow in the present embodiment illustrated in FIG. 9 differs from the control flow illustrated in FIG. 6 in processes after the step S104.

The control section 6 determines whether or not all transmission data from the communicated unit has been received successfully on the basis of a result of decoding by the decoding section 23 (step S105). In a case where all the transmission data has been received successfully (step S105; Y), the control section 6 ends the process.

In contrast, in a case where all the transmission data has not been received successfully (step S105; N), then, the control section 6 determines whether or not a predetermined time-segment has passed (step S106). In a case where the predetermined time-segment has not passed (step S106; N), the control section 6 repeats such determination until the predetermined time-segment has passed. In a case where the predetermined time-segment has passed (step S106; Y), the flow returns to the process in the step S102 to restore the period of access to the storage region of the storage section 24 to a period of all time slots.

Other configurations, operations, and effects may be substantially similar to those of the communication unit 1 according to the above-described first embodiment.

3. Third Embodiment

Next, a communication unit according to a third embodiment of the present disclosure is described. It is to be noted that in the following, substantially same components as those of the communication unit according to the above-described first or second embodiment are denoted by same reference numerals, and description thereof is omitted where appropriate.

[3.1 Configuration and Operation]

FIG. 11 illustrates an example of a control flow about control of the storage region by the communication unit according to the present embodiment. FIG. 12 schematically illustrates an example of the control of the storage region in the communication unit according to the present embodiment.

A configuration of the communication unit according to the present embodiment may be substantially similar to the configuration in FIG. 5. However, the way for the control section 6 to control the period of access to the storage region of the storage section 24 is partly different.

In the above-described first embodiment, the control section 6 uniformly places a limitation on access to the storage region in a period of reception of subsequent data from the communicated unit; however, in the present embodiment, in a case where subsequent data has been unsuccessfully received over a period of a predetermined number of time-segments, the limitation on the access period is removed as illustrated in FIG. 12.

In a case where reception of transmission data has been unsuccessfully consecutively performed, there may be a possibility of failure in time-segment synchronization. For example, coincidence with a timing of transmission data from another communication unit may interfere with reception of the transmission data. Accordingly, in the communication unit according to the present embodiment, in a case where reception of transmission data (CRC decoding) has been unsuccessfully consecutively performed in a predetermined number of time-segments, the period of access to the storage region of the storage section 24 is restored to a period of all time slots. This makes it possible to reduce power consumption as compared with a method of periodically restoring the access period to a period of all time slots as with the above-described second embodiment.

The control flow in the present embodiment illustrated in FIG. 11 differs from the control flow illustrated in FIG. 6 in processes after the step S104.

The control section 6 determines whether or not all transmission data from the communicated unit has been received successfully on the basis of a result of decoding by the decoding section 23 (step S105). In a case where all the transmission data has been received successfully (step S105; Y), the control section 6 ends the process.

In contrast, in a case where all the transmission data has not been received successfully (step S105; N), the control section 6 next determines whether or not reception of the transmission data has been unsuccessfully consecutively performed in a predetermined number of time-segments (step S107). In a case where reception of the transmission data has not been unsuccessfully consecutively performed in the predetermined number of time-segments (step S107; N), such determination is repeated. In a case where reception of the transmission data has been unsuccessfully consecutively performed in the predetermined number of time-segments (step S107; Y), the flow returns to the process in the step S102 to restore the period of access to the storage region of the storage section 24 to a period of all time slots.

Other configurations, operations, and effects may be substantially similar to those of the communication unit according to the above-described first or second embodiment.

4. Fourth Embodiment (Application Example)

The technology according to the present disclosure is applicable to various products. For example, the technology according to the present disclosure may be achieved in the form of an apparatus to be mounted to a mobile body of any kind. Examples of the mobile body include an automobile, an electric vehicle, a hybrid electric vehicle, a motorcycle, a bicycle, a personal mobility, an airplane, an unmanned aerial vehicle, a vessel, a robot, a construction machine, an agricultural machine (a tractor), etc.

It is to be noted that in the following description, each of GSM and HDMI is a registered trademark.

FIG. 13 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 13, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 13 includes a microcomputer 7610, a general-purpose communication I/F 7620, a dedicated communication I/F 7630, a positioning I/F 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 14 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 14 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 13, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like.

The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 13, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 13 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the communication unit and the communication system of the present disclosure are applicable to communication with the external environment 7750 of a terminal, etc. present in proximity to the vehicle via the general-purpose communication I/F 7620, for example. Moreover, the communication unit and the communication system of the present disclosure are applicable to communication with the in-vehicle devices 7760 such as a mobile device and a wearable device possessed by the occupant via the in-vehicle device I/F 7660.

5. Other Embodiments

The technique according to the present disclosure is not limited to the descriptions of the foregoing embodiments, and may be modified in a variety of ways.

For example, each component in the foregoing embodiments may be divided into a plurality of subcomponents, and the divided subcomponents may have different functions.

Moreover, for example, in the control flow in each of the foregoing embodiments, a control flow in which some of process steps are omitted may be executed. Moreover, a control flow in which another process step not described in the control flow is added may be executed. Further, a control flow in which the order of process steps defined in the control flow is partially changed may be executed.

For example, the present technology may have the following configurations.

(1)

A communication unit including:

a communication circuit section that receives transmission data divided into head data and one or more subsequent data from an communicated unit over a period of a plurality of time-segments;

a storage section having a storage region in which at least the transmission data received by the communication circuit section is stored; and a control section that places a limitation on an access period to cause a period of access to the storage region in a period of a time-segment in which the subsequent data is transmitted to become shorter than a period of access to the storage region in a period of a time-segment in which the head data is transmitted.

(2)

The communication unit according to (1), in which each of the plurality of time-segments includes a plurality of time slots, and the transmission data from the communicated unit is transmitted in a period of one time slot of the plurality of time slots in each of the plurality of time-segments.

(3)

The communication unit according to (2), in which the control section sets a period of all the plurality of time slots as the period of access to the storage region in the period of the time-segment in which the head data is transmitted, and sets a period of one time slot of the plurality of time slots as the period of access to the storage region in the period of the time-segment in which the subsequent data is transmitted.

(4)

The communication unit according to any one of (1) to (3), in which in a case where the communication circuit section receives a plurality of the subsequent data over a period of the plurality of time-segments, the control section periodically removes the limitation on the access period.

(5)

The communication unit according to any one of (1) to (3), in which in a case where the communication circuit section has unsuccessfully received the subsequent data over a period of a predetermined number of time-segments, the control section removes the limitation on the access period.

(6)

The communication unit according to any one of (1) to (5), in which in a case where the communication circuit section has normally received the head data from the communicated unit, the communication circuit section sends, to the communicated unit, a reply of acknowledgment indicating that the head data has been normally received within a period of a same time-segment as the time-segment in which the head data has been transmitted, and in a case where there is no reply of acknowledgment, the communicated unit retransmits the head data in a period of a time-segment different from the time-segment in which the head data has been transmitted unsuccessfully, and in a case where there is a reply of acknowledgment, the communicated unit sends the subsequent data in a period of a time-segment different from the time-segment in which the head data has been transmitted.

(7)

The communication unit according any one of (1) to (6), further including an antenna section including a first electrode and a second electrode, in which the communication circuit section performs communication using a human body as a communication medium through the antenna section.

(8)

A communication system including a first communication unit; and a second communication unit that transmits transmission data to the first communication unit, one or both of the first communication unit and the second communication unit including a communication circuit section that receives transmission data divided into head data and one or more subsequent data from an communicated unit over a period of a plurality of time-segments, a storage section having a storage region in which at least the transmission data received by the communication circuit section is stored, and a control section that places a limitation on an access period to cause a period of access to the storage region in a period of a time-segment in which the subsequent data is transmitted to become shorter than a period of access to the storage region in a period of a time-segment in which the head data is transmitted.

(9)

The communication system according to (8), in which the second communication unit performs communication using a human body as a communication medium with the first communication unit.

This application claims the benefit of Japanese priority Patent Application JP2016-201752 filed with the Japan Patent Office on Oct. 13, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A communication unit comprising:

communication circuitry configured to receive transmission data divided into head data and one or more subsequent data from a communicated unit over a period of a plurality of time-segments;

a memory including a storage region in which at least the transmission data received by the communication circuitry is stored; and a controller configured to place a limitation on an access period to cause a period of access to the storage region in a period of a time-segment in which the one or more subsequent data is transmitted to become shorter than a period of access to the storage region in a period of a time-segment in which the head data is transmitted.

2. The communication unit according to claim 1, wherein each of the plurality of time-segments includes a plurality of time slots, and the transmission data from the communicated unit is transmitted in a period of one time slot of the plurality of time slots in each of the plurality of time-segments.

3. The communication unit according to claim 2, wherein the controller sets a period of all the plurality of time slots as the period of access to the storage region in the period of the time-segment in which the head data is transmitted, and sets a period of one time slot of the plurality of time slots as the period of access to the storage region in the period of the time-segment in which the one or more subsequent data is transmitted.

4. The communication unit according to claim 1, wherein in a case where the communication circuitry receives a plurality of the subsequent data over a period of the plurality of time-segments, the controller periodically removes the limitation on the access period.

5. The communication unit according to claim 1, wherein in a case where the communication circuitry has unsuccessfully received the one or more subsequent data over a period of a predetermined number of time-segments, the controller removes the limitation on the access period.

6. The communication unit according to claim 1, wherein in a case where the communication circuitry has normally received the head data from the communicated unit, the communication circuitry sends, to the communicated unit, a reply of acknowledgment indicating that the head data has been normally received within a period of a same time-segment as the time-segment in which the head data has been transmitted, and in a case where there is no reply of acknowledgment, the communicated unit retransmits the head data in a period of a time-segment different from the time-segment in which the head data has been transmitted unsuccessfully, and in a case where there is a reply of acknowledgment, the communicated unit sends the one or more subsequent data in a period of a time-segment different from the time-segment in which the head data has been transmitted.

7. The communication unit according to claim 1, further comprising an antenna section including a first electrode and a second electrode, wherein the communication circuitry performs communication using a human body as a communication medium through the antenna section.

8. A communication system comprising:

a first communication unit; and a second communication unit that transmits transmission data to the first communication unit, one or both of the first communication unit and the second communication unit including communication circuitry configured to receive transmission data divided into head data and one or more subsequent data from a communicated unit over a period of a plurality of time-segments, a memory including a storage region in which at least the transmission data received by the communication circuitry is stored, and a controller configured to place a limitation on an access period to cause a period of access to the storage region in a period of a time-segment in which the one or more subsequent data is transmitted to become shorter than a period of access to the storage region in a period of a time-segment in which the head data is transmitted.

9. The communication system according to claim 8, wherein the second communication unit performs communication using a human body as a communication medium with the first communication unit.

10. The communication system according to claim 8, wherein
each of the plurality of time-segments includes a plurality of time slots, and
the transmission data from the communicated unit is transmitted in a period of one time slot of the plurality of time slots in each of the plurality of time-segments.

11. The communication system according to claim 10, wherein the controller sets a period of all the plurality of time slots as the period of access to the storage region in the period of the time-segment in which the head data is transmitted, and sets a period of one time slot of the plurality of time slots as the period of access to the storage region in the period of the time-segment in which the one or more subsequent data is transmitted.

12. The communication system according to claim 8, wherein in a case where the communication circuitry receives a plurality of the subsequent data over a period of the plurality of time-segments, the controller periodically removes the limitation on the access period.

13. The communication system according to claim 8, wherein in a case where the communication circuitry has unsuccessfully received the one or more subsequent data over a period of a predetermined number of time-segments, the controller removes the limitation on the access period.

14. The communication system according to claim 8, wherein
in a case where the communication circuitry has normally received the head data from the communicated unit, the communication circuitry sends, to the communicated unit, a reply of acknowledgment indicating that the head data has been normally received within a period of a same time-segment as the time-segment in which the head data has been transmitted, and
in a case where there is no reply of acknowledgment, the communicated unit retransmits the head data in a period of a time-segment different from the time-segment in which the head data has been transmitted unsuccessfully, and in a case where there is a reply of acknowledgment, the communicated unit sends the one or more subsequent data in a period of a time-segment different from the time-segment in which the head data has been transmitted.

15. The communication system according to claim 8, wherein
one or both of the first communication and the second communication unit further include an antenna section including a first electrode and a second electrode, and
wherein the communication circuitry performs communication using a human body as a communication medium through the antenna section.

* * * * *